(12) United States Patent
Lee et al.

(10) Patent No.: US 8,599,818 B2
(45) Date of Patent: Dec. 3, 2013

(54) APPARATUS AND METHOD FOR EMPLOYING COMMON CONTROL CHANNEL AND BROADCAST CHANNEL IN A BROADBAND WIRELESS COMMUNICATION SYSTEM WITH FREQUENCY OVERLAY

(75) Inventors: Mi-Hyun Lee, Seongnam-si (KR);
Ho-Kyu Choi, Seongnam-si (KR);
Jae-Weon Cho, Gwacheon-si (KR);
Song-Eun Park, Seoul (KR);
Seung-Hoon Choi, Suwon-si (KR);
Song-Nam Hong, Suwon-si (KR);
Dong-Seek Park, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 586 days.

(21) Appl. No.: 12/456,016

(22) Filed: Jun. 10, 2009

(65) Prior Publication Data
US 2009/0303969 A1  Dec. 10, 2009

(30) Foreign Application Priority Data
Jun. 10, 2008  (KR) .................. 10-2008-0054060

(51) Int. Cl.
*H04B 7/208* (2006.01)
*H04L 5/00* (2006.01)
(52) U.S. Cl.
CPC .............. *H04B 7/208* (2013.01); *H04L 5/001* (2013.01)
USPC ...................................... 370/344; 370/350

(58) Field of Classification Search
USPC .................. 370/336, 342, 344, 350; 375/302; 455/515
See application file for complete search history.

(56) References Cited

U.S. PATENT DOCUMENTS

| 2008/0019350 A1* | 1/2008 | Onggosanusi et al. ....... 370/350 |
| 2008/0130484 A1* | 6/2008 | Zhang et al. .................. 370/208 |
| 2009/0135802 A1* | 5/2009 | Haga et al. .................... 370/350 |

FOREIGN PATENT DOCUMENTS

| KR | 10-1999-0044465 | 6/1999 |
| KR | 10-2007-0077023 | 7/2007 |

OTHER PUBLICATIONS

Notice of Preliminary Rejection dated Jun. 19, 2013 in connection with Korean Patent Application No. 10-2008-0054060, 9 pages.

* cited by examiner

*Primary Examiner* — Pao Sinkantarakorn
*Assistant Examiner* — Richard K Chang (57) ABSTRACT

A broadband wireless communication system supporting frequency overlay is provided. Operations of a base station includes checking whether it is time to transmit a common control signal; switching positions of a first Common Control Channel and a second Common Control Channel applied to a previous transmission of the common control signal while mapping a common control signal to the first Common Control Channel and the second Common Control Channel positioned in different Frequency Assignments; and transmitting the common control signal via the first Common Control Channel and the second Common Control Channel that are switched.

24 Claims, 9 Drawing Sheets

APPARATUS AND METHOD FOR EMPLOYING COMMON CONTROL CHANNEL AND BROADCAST CHANNEL IN A BROADBAND WIRELESS COMMUNICATION SYSTEM WITH FREQUENCY OVERLAY

CROSS-REFERENCE TO RELATED APPLICATION(S) AND CLAIM OF PRIORITY

The present application is related to and claims the benefit under 35 U.S.C. §119(a) to a Korean patent application filed in the Korean Intellectual Property Office on Jun. 10, 2008 and assigned Serial No. 10-2008-0054060, the entire disclosure of which is hereby incorporated by reference.

TECHNICAL FIELD OF THE INVENTION

The present invention relates generally to a broadband wireless communication system supporting a frequency overlay. More particularly, the present invention relates to an apparatus and a method for efficiently transmitting and receiving a Common Control Channel (CCCH) in the broadband wireless communication system supporting the frequency overlay.

BACKGROUND OF THE INVENTION

The $4^{th}$-generation (4G) communication system, which is a future communication system, is advancing to providing users with various services such as broadcasting, multimedia video, and multimedia message. In particular, the future wireless mobile communication system is developing to offer data service over 100 Mbps to a user moving fast and data service over 1 Gbps to a user moving slowly. Its representative communication system is an Institute of Electrical and Electronics Engineers (IEEE) 802.16 system. The IEEE 802.16 system employs an Orthogonal Frequency Division Multiplexing (OFDM)/Orthogonal Frequency Division Multiple Access (OFDMA) scheme to support a broadband delivery network in a physical layer.

The broadband wireless communication system should be able to support terminals of different available bandwidths and to operate a plurality of frequency bands in one or more frequency spectrums as well. To transmit and receive signals in the various bandwidths or the multiple frequency bands, a multicarrier scheme or a frequency overlay scheme can be adopted. Herein, the multicarrier scheme or the frequency overlay scheme transmits and receives signals over the different bandwidths or one or more frequency bands at the same time.

Figure 1:
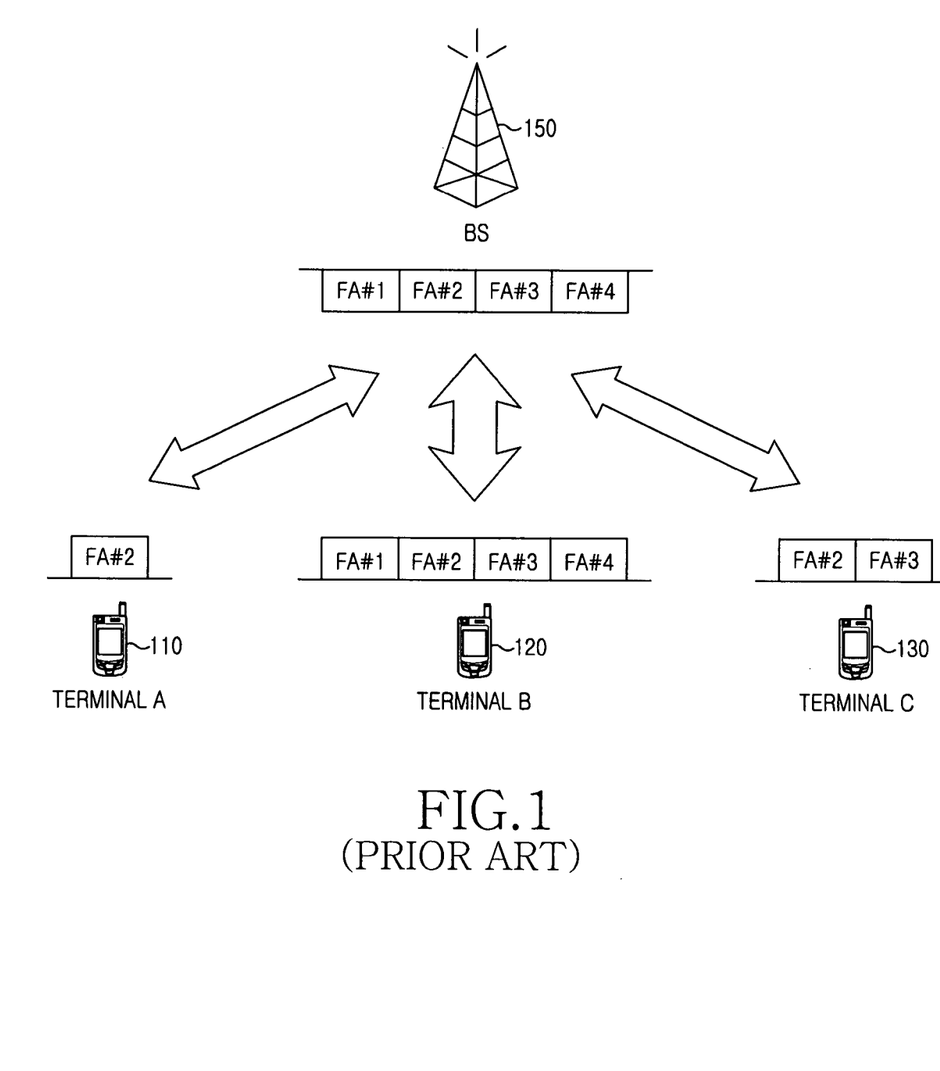
FIG. 1 illustrates use of Frequency Assignments according to frequency overlay in a broadband wireless communication system.

FIG. 1 illustrates the division of the frequency band into a plurality of subbands at a base station of the broadband wireless communication system to support terminals of different bandwidths. In FIG. 1, given a terminal A 110 with one Frequency Assignment (FA), a terminal B 120 with four FAs, and a terminal C 130 with two FAs, the terminal A 110 uses FA#2, the terminal B 120 uses FA#1 through FA#4, and the terminal C 130 uses FA#2 and FA#3. However, the terminal A 110 can selectively use one of FA#1 through FA#4, rather than using only FA#2. The terminal C 130 can use any two of FA#1 through FA#4. According to capability of the terminal, two consecutive or discontinuous FAs may be used concurrently. Accordingly, the base station 150 needs to suitably regulate the FAs used by the terminals by taking into account the bandwidth use capability of the accessed terminals. The base station 150 transmits and receives signals by allocating one or more FAs based on the bandwidth (the band processing capability) of the terminals.

As discussed above, in the broadband wireless communication system supporting the frequency overlay, the base station needs to provide a synchronization signal for time, frequency and frame synchronization and system acquisition information required for connections to each terminal. Simultaneously, the base station 150, which supports the terminals using the different FAs concurrently, needs to transmit the synchronization signal and the system acquisition information in every FA. However, since the synchronization signal and the system acquisition information exclusively occupy resources from traffic data, the redundant transmission of the synchronization signal and the system acquisition information lower the system capacity. Therefore, what is needed is a method for reducing overhead caused by the synchronization signal and the system acquisition information.

SUMMARY OF THE INVENTION

To address the above-discussed deficiencies of the prior art, it is a primary aspect of the present invention to address at least the above mentioned problems and/or disadvantages and to provide at least the advantages described below. Accordingly, an aspect of the present invention is to provide an apparatus and a method for providing a synchronization signal and system acquisition information to terminals of different bandwidths in a broadband wireless communication system supporting a frequency overlay.

Another aspect of the present invention is to provide an apparatus and a method for reducing overhead caused by a synchronization signal and system acquisition information in a broadband wireless communication system supporting a frequency overlay.

Yet another aspect of the present invention is to provide an apparatus and a method for supporting a Common Control Channel in a structure accessible by every terminal, regardless of the number of FAs in use, in a broadband wireless communication system supporting a frequency overlay.

Still another aspect of the present invention is to provide an apparatus and a method for supporting a CCCH in a structure distributed to Frequency Assignments in a broadband wireless communication system supporting a frequency overlay.

A further another aspect of the present invention is to provide an apparatus and a method for supporting a CCCH in a structure switched every time in a broadband wireless communication system supporting a frequency overlay.

According to one aspect of the present invention, an operating method of a base station in a broadband wireless communication system supporting frequency overlay includes checking whether it is time to transmit a common control signal; switching positions of a first CCCH and a second CCCH applied to a previous transmission of the common control signal while mapping a common control signal to the first CCCH and the second CCCH positioned in different FAs; and transmitting the common control signal via the first CCCH and the second CCCH which are switched.

According to another aspect of the present invention, an operating method of a terminal in a broadband wireless communication system supporting frequency overlay includes acquiring a first partial common control signal received in a CCCH; after a common control signal transmission period passes by, acquiring a second partial common control signal received in the CCCH; and constituting a complete common control signal by combining the first partial common control signal and the second partial common control signal.

According to still another aspect of the present invention, an operating method of a terminal in a broadband wireless communication system supporting frequency overlay includes obtaining a first partial common control signal and a second partial common control signal through a first CCCH and a second CCCH positioned in different FAs; and constituting a complete common control signal by combining the first partial common control signal and the second partial common control signal.

According to yet another aspect of the present invention, an apparatus of a base station in a broadband wireless communication system supporting frequency overlay includes a generator for, when it is time to transmit a common control signal, providing partial common control signals that are divided from a complete common control signal; mappers for switching positions of a first CCCH and a second CCCH applied to a previous transmission of the common control signal while mapping a common control signal to the first CCCH and the second CCCH positioned in different FAs; and a transmitter for transmitting the common control signal via the first CCCH and the second CCCH which are switched.

According to a further aspect of the present invention, an apparatus of a terminal in a broadband wireless communication system supporting frequency overlay includes an aggregator for acquiring a first partial common control signal received in a CCCH and, after a common control signal transmission period passes by, acquiring a second partial common control signal received in the CCCH; and a combiner for constituting a complete common control signal by combining the first partial common control signal and the second partial common control signal.

According to a further aspect of the present invention, an apparatus of a terminal in a broadband wireless communication system supporting frequency overlay includes an aggregator for obtaining a first partial common control signal and a second partial common control signal through a first CCCH and a second CCCH positioned in different FAs; and a combiner for constituting a complete common control signal by combining the first partial common control signal and the second partial common control signal.

Other aspects, advantages, and salient features of the invention will become apparent to those skilled in the art from the following detailed description, which, taken in conjunction with the annexed drawings, discloses exemplary embodiments of the invention.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

Throughout the drawings, like reference numerals will be understood to refer to like parts, components and structures.

DETAILED DESCRIPTION OF THE INVENTION

FIGS. 2A through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

Exemplary embodiments of the present invention provide a technique for reducing overhead caused by a CCCH in a broadband wireless communication system. Hereinafter, a wireless communication system based on OFDM/OFDMA is illustrated by way of example. It will be understood that the present invention is applicable to other wireless communication systems.

The CCCH is a channel for delivering signals and information to be received by a terminal for its access to a base station. The CCCH typically includes a Synchronization Channel (SCH) and a Broadcast Channel (BCH). The SCH delivers signals for time and frequency synchronization acquisition, frame synchronization acquisition, cell searching, and cell identification. In general, a synchronization signal is constituted with sequences defined in advance is transmitted in the SCH. The BCH is used to broadcast system acquisition information that should be known to entities in a cell for their communication. For example, Cyclic Prefix (CP) length, bandwidth, resource block information, and antenna related information are broadcast in the BCH. The terminal acquires the frame synchronization over the SCH and receives the information broadcast over the BCH. Accordingly, the SCH and the BCH are stationary in a predefined location within the frame.

The present invention provides a structure of the CCCH by referring to the drawings illustrating the frame structure. For explanation purposes only, a base station is assumed to use four FAs. It will be understood that that the base station does not always use four FAs and may use three or less FAs, or five or more FAs. In the broadband wireless communication system of the present invention, there may be multiple base stations using a different number of FAs.

Figure 2A:
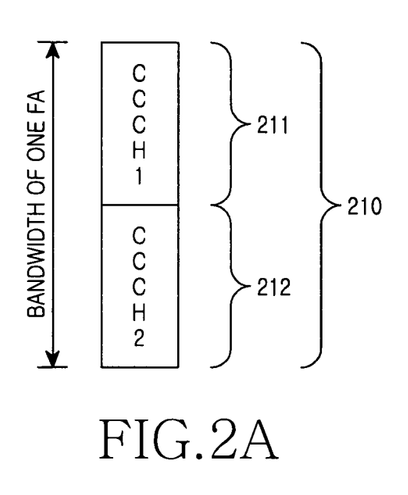
FIGS. 2A and 2B illustrate structures of a Common Control Channel in a broadband wireless communication system according to an exemplary embodiment of the present invention.
Figure 2B:
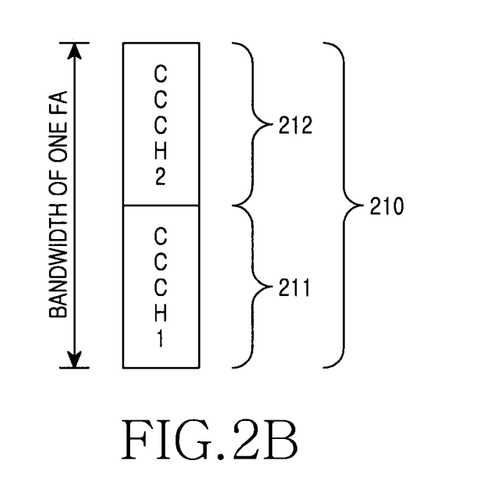

The CCCH is split in two as illustrated in FIGS. 2A and 2B. The CCCH 210 occupying one FA band includes a first CCCH 211 and a second CCCH 212, each occupying half of one FA bandwidth. Accordingly, a common control signal transmitted over the CCCH is divided into two portions and the divided partial common control signals are transmitted over the first CCCH 211 and the second CCCH 212 respectively. Herein, the common control signal includes a synchronization signal for acquiring frame synchronization and system acquisition information required for the access to the base station. For example, the entire sequence of the synchronization signal is split into two sequences and the partial synchronization signals of the divided sequences are transmitted over SCHs of the first CCCH 211 and the second CCCH 212 respectively.

The complete common control signal is produced by combining the partial common control signals transmitted over the first CCCH 211 and the second CCCH 212. Locations of the first CCCH 211 and the second CCCH 212 may be exchanged with each other. For example, the first CCCH 211 may be disposed in the upper band and the second CCCH 212 may be disposed in the lower band as illustrated in FIG. 2A, or vice versa, as illustrated in FIG. 2B.

Figure 3:
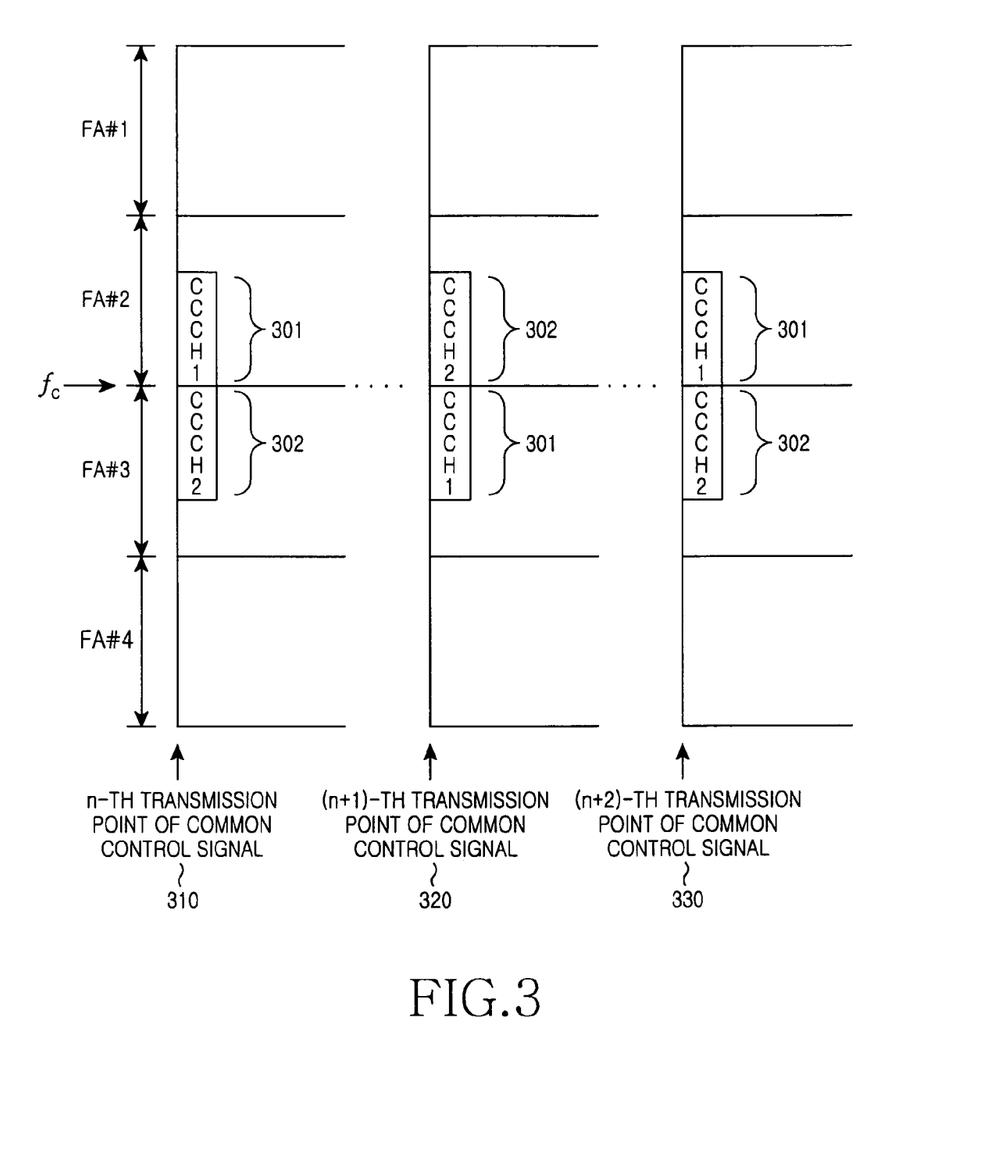
FIG. 3 illustrates use of the Common Control Channel in the broadband wireless communication system according to an exemplary embodiment of the present invention.

The CCCH of FIGS. 2A and 2B is used within the frame as illustrated in FIG. 3. In FIG. 3, the first CCCH 301 and the second CCCH 302 are positioned in the upper band and the lower band respectively, which are divided based on a center frequency $f_c$ of the base station. That is, the first CCCH 301 and the second CCCH 302 are positioned in the different FAs, and the different FAs are adjacent to the center frequency f, of the base station. At every transmission of the CCCH, the locations of the first CCCH 301 and the second CCCH 302 are switched. For example, at the n-th CCCH transmission point 310 of FIG. 3, the first CCCH 301 is positioned in the upper band and the second CCCH 302 is positioned in the lower band. At the (n+1)-th CCCH transmission point 320, the second CCCH 302 is positioned in the upper band and the first CCCH 301 is positioned in the lower band. At the (n+2)-th CCCH transmission point 330, the first CCCH 301 is positioned in the upper band and the second CCCH 302 is positioned in the lower band. Thus, a terminal using both of the upper band and the lower band detects the complete common control signal over both of the first CCCH 301 and the second CCCH 302 at the same time. By contrast, a terminal using part of the upper band or the lower band receives the partial common control signals for two times and then detects the complete common control signal.

Figure 4:
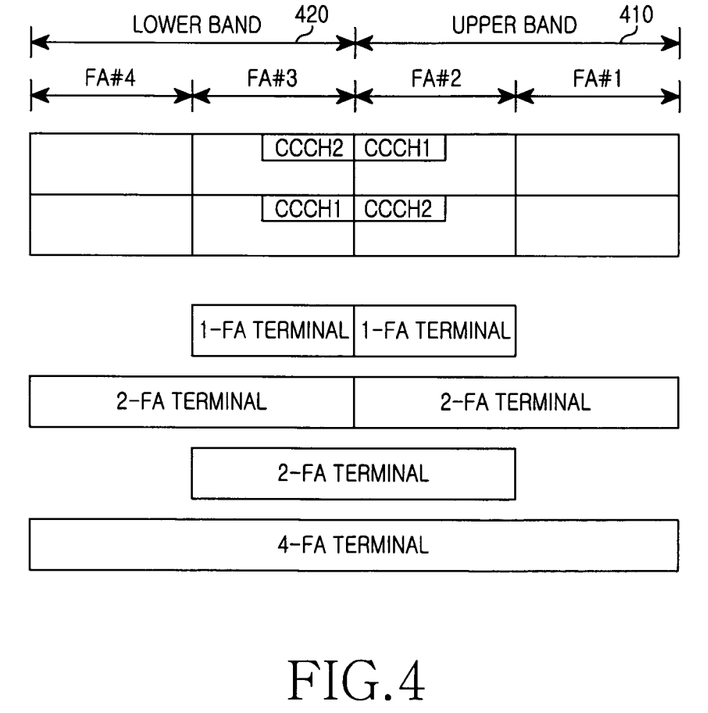
FIG. 4 illustrates use of Frequency Assignments based on the number of Frequency Assignments in use of a terminal in the broadband wireless communication system according to an exemplary embodiment of the present invention.

With the CCCH of FIG. 3, the band use of the terminal based on the number of the used FAs of the terminal is illustrated in FIG. 4. The terminal should access to a band including at least one of the FAs in the CCCH. That is, the 1-FA terminal accesses one of FA#2 and FA#3 and should not access to FA#1 and FA#4. The 2-FA terminal accesses using one of FA#1-FA#2, FA#3-FA#4, and FA#2-FA#3. When accessing using either FA#1-FA#2 or FA#3-FA#4, the 2-FA terminal may not access to the CCCH1 and the CCCH2 at the same time. Similar to the 1-FA terminal, the 2-FA terminal receives the partial common control signals for two times and then detects the complete common control signal. The 4-FA terminal, which is able to receive over the entire band, receives the complete common control signal at the same time.

Hereafter, operations and structures of the base station and the terminal using the CCCH as constituted above are described in detail by referring to the drawings.

Figure 5:
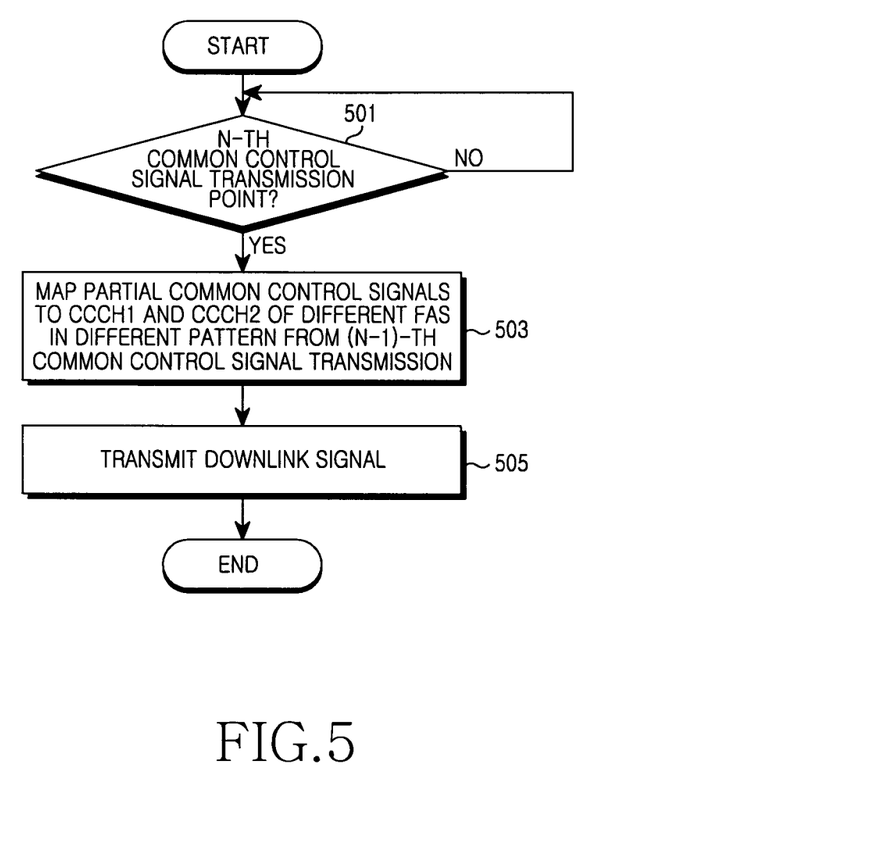
FIG. 5 illustrates a flowchart of operations of a base station in the broadband wireless communication system according to an exemplary embodiment of the present invention.

FIG. 5 illustrates a flowchart of operations of the base station in the broadband wireless communication system according to an exemplary embodiment of the present invention.

In step 501, the base station checks whether it is time to transmit the n-th common control signal. The common control signal is transmitted on a periodic basis over the CCCH. Herein, the common control signal includes the synchronization signal and the system acquisition information. Namely, the base station checks whether it is time to use the CCCH.

When it is the time to transmit the n-th common control signal, the base station maps the partial common control signals divided from the common control signal, to the CCCH1 and the CCCH2 of the different FAs in step 503. The base station maps the two partial common control signals divided from the common control signal, to the CCCH1 and the CCCH2 in the two FAs adjacent to the center frequency respectively. First, the base station switches the positions of the CCCH1 and the CCCH2 used for the (n−1)-th common control signal transmission. For example, when the CCCH1 lies in the FA#2 and the CCCH2 lies in the FA#3 in the (n−1)-th common control signal transmission, the base station puts the CCCH1 in the FA#3 and the CCCH2 in the FA#2. For example, the structures of the CCCH1 and the CCCH2 are illustrated in FIG. 3.

In step 505, the base station transmits a downlink signal. More specifically, the base station converts the signals mapped to the CCCH1 and the CCCH2 in step 503 to OFDM symbols, up-converts the OFDM symbols to a Radio Frequency (RF) signal, and then transmits the RF signal via an antenna. Also, the base station transmits a control signal and traffic data.

Figure 6:
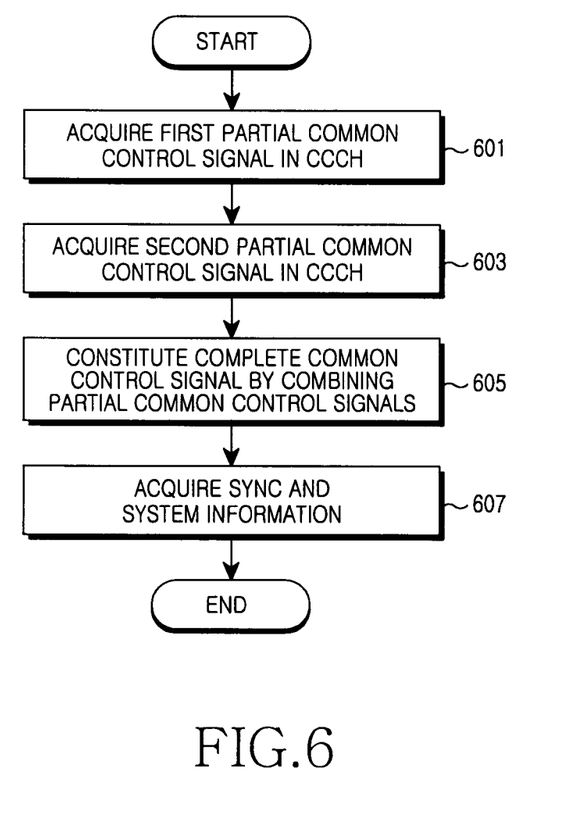
FIG. 6 illustrates a flowchart of operations of a terminal using only one Common Control Channel in the broadband wireless communication system according to an exemplary embodiment of the present invention.

FIG. 6 illustrates a flowchart of operations of the terminal using only one CCCH in the broadband wireless communication system according to an exemplary embodiment of the present invention. Particularly, FIG. 6 illustrates the operations of the terminal which uses only one random CCCH.

In step 601, the terminal acquires the first partial common control signal received in the CCCH. The common control signal is divided into the first partial common control signal and the second partial common control signal. The first partial common control signal and the second partial common control signal are transmitted in the different FAs. Hence, in some embodiments, the terminal may not receive both of the common control signals at the same time. Herein, the common control signal includes the synchronization signal and the system acquisition information.

After the first partial common control signal is obtained and a common control signal transmission period passes by, the terminal acquires the second partial common control signal received over the CCCH in step 603. For example, the structures of the CCCH1 and the CCCH2 are illustrated in FIG. 3.

In step 605, the terminal constitutes the complete common control signal by combining the first partial common control signal and the second partial common control signal.

In step 607, the terminal acquires the synchronization and the system acquisition information using the common control signal. That is, the terminal splits the complete common control signal to the synchronization signal and the system acquisition information. Next, the terminal synchronizes with the base station using the synchronization signal and acquires the system acquisition information of the base station.

Figure 7:
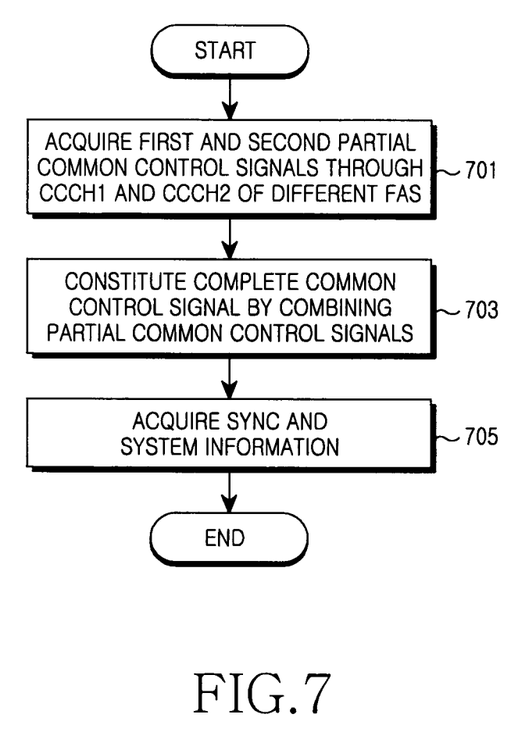
FIG. 7 illustrates a flowchart of operations of the terminal using every Common Control Channel in the broadband wireless communication system according to an exemplary embodiment of the present invention.

FIG. 7 illustrates a flowchart of operations of the terminal using every CCCH in the broadband wireless communication system according to an exemplary embodiment of the present invention; that is, the operations of the terminal which uses a plurality of FAs.

In step 701, the terminal obtains the first partial common control signal and the second partial common control signal over the CCCH1 and the CCCH2 of the different FAs. Herein, the first partial common control signal and the second partial common control signal are split from the complete common control signal. For example, the structures of the first partial common control signal and the second partial common control signal are illustrated in FIG. 3.

In step 703, the terminal constitutes the complete common control signal by combining the first partial common control signal and the second partial common control signal.

In step 705, the terminal acquires the synchronization and the system acquisition information using the common control signal. That is, the terminal splits the complete common control signal to the synchronization signal and the system acquisition information signal. Next, the terminal synchronizes with the base station using the synchronization signal and acquires the system acquisition information of the base station.

In FIGS. 6 and 7, the first partial common control signal and the second partial common control signal can be the same signals. In this case, the link performance is enhanced by virtue of the repetitive transmission. More specifically, the terminal operating as illustrated in FIG. 6 receives the single common control signal at one transmission point. At this time, there is no enhancement in the link performance, whereas the entire common control signal is received at a time. The terminal operating as illustrated in FIG. 7 receives two common control signals at one transmission point and thus attains the combining gain and the diversity gain over 3 dB through the repetitive transmission.

Figure 8:
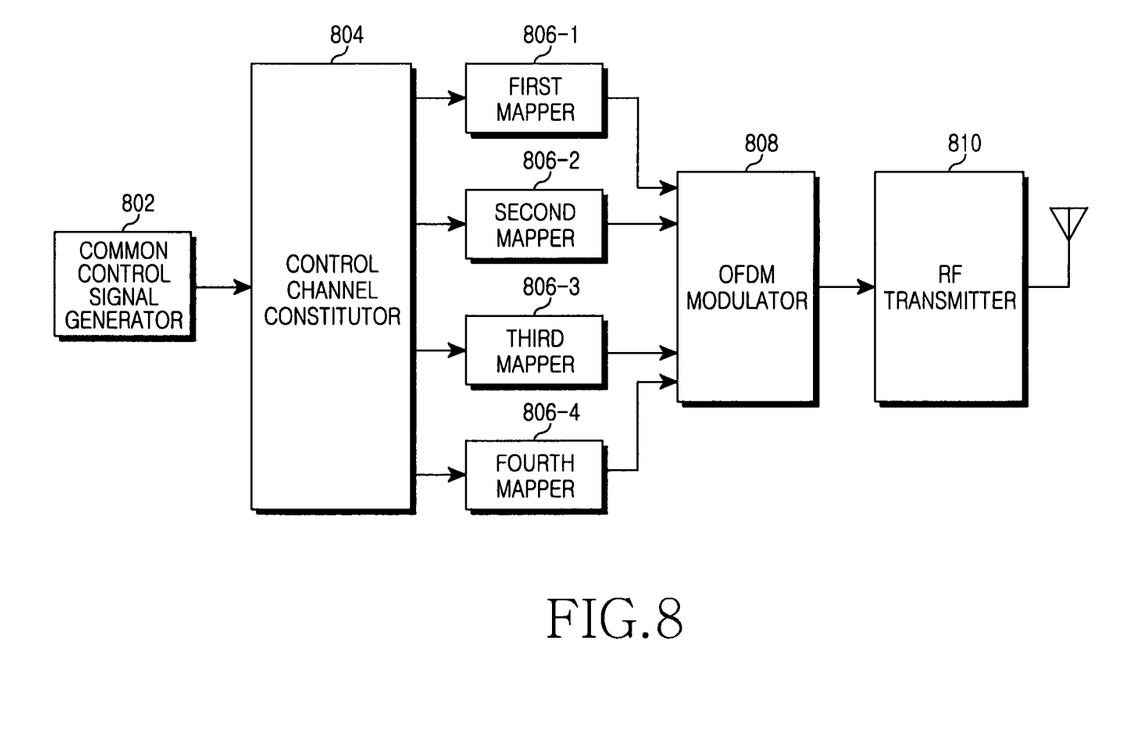
FIG. 8 illustrates the base station in the broadband wireless communication system according to an exemplary embodiment of the present invention.

FIG. 8 illustrates a block diagram of the base station in the broadband wireless communication system according to an exemplary embodiment of the present invention.

The base station of FIG. 8 includes a common control signal generator 802, a control channel constitutor 804, a plurality of mappers 806-1 through 806-4, an OFDM modulator 808, and an RF transmitter 810.

The common control signal generator 802 generates the common control signal to transmit over the CCCH. The common control signal includes the synchronization signal for the frame synchronization and the signal of the system acquisition information required for the access to the base station. For example, the common control signal may include signals of the synchronization sequence, the antenna related information, the bandwidth information, the CP length information, and the resource block information. The common control signal generator 802 divides the common control signal into a plurality of partial common control signals and outputs the partial common control signals.

The control channel constitutor 804 divides the partial common control signals of the common control signal output from the common control signal generator 802, and provides the partial common control signals to the mappers 806-1 through 806-4. For example, the control channel constitutor 804 provides the partial common control signals to the second mapper 806-2 and the third mapper 806-3 which manage the FA including the CCCH1 and the CCCH2 among the mappers 806-1 through 806-4. At every CCCH transmission point, the control channel constitutor 804 switches the partial common control signals applied to the second mapper 806-2 and the third mapper 806-3. For instance, when the first partial common control signal is fed to the second mapper 806-2 and the second partial common control signal is fed to the third mapper 806-3 at the (n−1)-th CCCH transmission point, the control channel constitutor 804 outputs the second partial common control signal to the second mapper 806-2 and the first partial common control signal to the third mapper 806-3 at the n-th CCCH transmission point.

The mappers 806-1 through 806-4 map the signals to transmit in the corresponding FA according to the frame structure of their corresponding FA. The second mapper 806-2 and the third mapper 806-3 each map the partial common control signal output from the control channel constitutor 804 to the CCCH1 or the CCCH2. The CCCH1 and the CCCH2 processed by the second mapper 806-2 and the third mapper 806-3 are switched in every common control signal transmission. Accordingly, in every CCCH transmission, the second mapper 806-2 and the third mapper 806-3 receive the partial common control signals different from the previous common control signal transmission. A unicast control channel or a data channel can be provided to the mapper receiving no CCCH. Alternatively, the above transmission may be implemented based on two center frequencies. The CCCH can be provided by using the first mapper 806-1 and the second mapper 806-2 for the first center frequency and using the third mapper 806-3 and the fourth mapper 806-4 for the second center frequency.

The OFDM modulator 808 converts the signals that are mapped to the frequency domain and output from the mappers 806-1 through 806-4, to time-domain signals using Inverse Fast Fourier Transform (IFFT) operation, and constitutes OFDM symbols by inserting CP. The RF transmitter 810 up-converts the OFDM symbols output from the OFDM modulator 808 to an RF signal and transmits the RF signal over an antenna.

Figure 9:
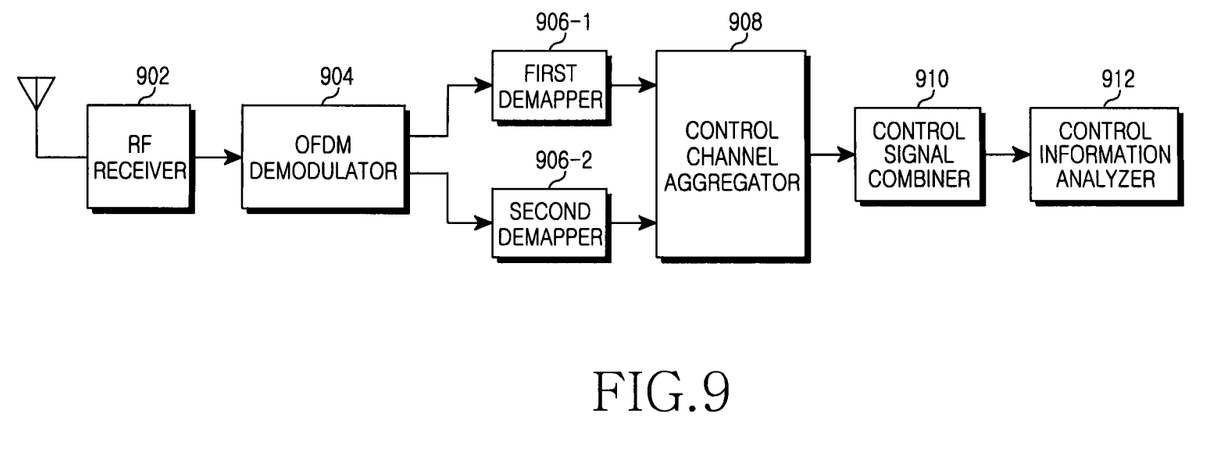
FIG. 9 illustrates the terminal in the broadband wireless communication system according to an exemplary embodiment of the present invention.

FIG. 9 illustrates a block diagram of the terminal in the broadband wireless communication system according to an exemplary embodiment of the present invention.

The terminal of FIG. 9 includes an RF receiver 902, an OFDM demodulator 904, a plurality of demappers 906-1 and 906-2, a control channel aggregator 908, a control signal combiner 910, and a control information analyzer 812.

The RF receiver 902 down-converts the RF signal received via an antenna to a baseband signal. The OFDM demodulator 904 divides the signal output from the RF receiver 902 on the OFDM symbol basis, removes the CP, and restores the frequency-domain signals through FFT operation. The OFDM demodulator 904 divides the frequency-domain signals on the FA basis and outputs the divided signals to the demappers 906-1 and 906-2.

The demappers 906-1 and 906-2 extract the signals received in the corresponding FA, according to the frame structure of the corresponding FA. The mapping relation between the demappers 906-1 and 906-2 and the bands vary depending on the frequency overlay state provided by the base station and the location of the center frequency accessed by the terminal. In particular, the demappers 906-1 and 906-2 each extract the signal mapped to the resource corresponding to the CCCH and output the extracted signal to the control channel aggregator 908. The CCCH processing function of the demappers 906-1 and 906-2 is controlled by the control channel aggregator 908.

The control channel aggregator 908 forwards the partial common control signals received over the CCCH1 and the CCCH2 and outputs from the demappers 906-1 and 906-2, to the control signal combiner 910. For doing so, the control channel aggregator 908 measures correlation with the synchronization sequence with respect to the signals output from the demappers 906-1 and 906-2. When detecting the high correlation with the synchronization sequence in all of the signals output from the demappers 906-1 and 906-2, the control channel aggregator 908 determines the access to the center frequency band including the CCCH. For example, the 4-FA terminal in FIG. 4 is applied to this situation. When detecting the high correlation with the synchronization sequence in only one of the signals output from the demappers 906-1 and 906-2, the control channel aggregator 908 determines the access to the center frequency band of the partial common control signal. The 1-FA terminal in FIG. 4 is applied to this situation. According to the result of the determination, the control channel aggregator 908 selects the mapper for receiving the CCCH based on the correlation between the signals output from the demappers 906-1 and 906-2 and the synchronization sequence. One or more mappers may be selected based on the bandwidth and the band processing capability of the terminal. The control channel aggregator 908 aggregates the partial common control signals extracted from the CCCH1 or the CCCH2 output from the selected mapper.

When receiving the common control signal from one of the demappers 906-1 and 906-2, the control channel aggregator 908 receives the partial common control signals from one of the demappers 906-1 and 906-2 for two times and then outputs the partial common control signals collected for two times to the control signal combiner 910. By contrast, when the common control signal is provided through all of the demappers 906-1 and 906-2, the control channel aggregator 908 receives the partial common control signals from the demappers 906-1 and 906-2 concurrently and then outputs the aggregated signals to the control signal combiner 910. In some embodiments, the partial common control signals output from the demappers 906-1 and 906-2 are switched every time. For example, when the first partial common control signal is output from the first demapper 906-1 and the second partial common control signal is output from the second demapper 906-2 at the point of the (n−1)-th common control signal reception, the first partial common control signal is fed from the second demapper 906-2 and the second partial common control signal is fed from the first demapper 906-1 at the point of the n-th common control signal reception.

The control signal combiner 910 constitutes the complete common control signal by combining the partial common control signals output from the control channel aggregator 908. If the common control information is repeatedly transmitted and the common control signal is received through one of the demappers 906-1 and 906-2, the control signal combiner 910 may combine the partial common control signals collected at the multiple transmission points for the sake of the enhancement of the link performance. Herein, the common control signal includes the synchronization signal and the system acquisition information for the system acquisition.

For example, the common control signal includes the synchronization sequence, the antenna related information, the bandwidth information, the CP length information, the resource block information, and so forth. The control signal combiner 910 provides the constituted common control signal to the control information analyzer 912. The control information analyzer 912 converts the common control signal output from the control signal combiner 910 to an information bit stream and acquires the system information.

As set forth above, the common control signal structure of the present invention may support the frequency overlay system and the non-frequency overlay system by means of the single transmission structure. Thus, the commonality for the terminal and the system configuration may be maximized. Herein, the commonality signifies that the system supporting the frequency overlay and the system not supporting the frequency overlay may use the same structure; that is; use one structure providing the common control channel based on the arbitrary center frequency band in the system. Therefore, the complexity in implementing the system and the terminal may be lowered.

The broadband wireless communication system supporting the frequency overlay may mitigate the overhead caused by the common control channel by supporting the common control channel which is switched and divided.

While the invention has been shown and described with reference to certain exemplary embodiments thereof, it will be understood by those skilled in the art that various changes in form and details may be made therein without departing from the spirit and scope of the invention as defined by the appended claims and their equivalents.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. An operating method of a base station in a wireless communication system supporting frequency overlay, the method comprising:
checking whether it is time to transmit a common control signal;
switching positions of a first Common Control Channel (CCCH) and a second CCCH applied to a previous transmission of the common control signal while mapping the common control signal to the first CCCH and the second CCCH positioned in different Frequency Assignments (FAs), wherein the first CCCH and the second CCCH are positioned in two FAs adjacent to a center frequency and each occupy less than a total bandwidth of a FA; and
transmitting the common control signal via the first CCCH and the second CCCH that are switched.

2. The method of claim 1, wherein the first CCCH and the second CCCH comprise at least one of a Synchronization Channel (SCH) and a Broadcast Channel (BCH).

3. The method of claim 1, wherein the first CCCH and the second CCCH each occupy a half of a bandwidth of an FA.

4. The method of claim 1, wherein the common control signal comprises a synchronization signal for acquiring at least one of time, frequency and frame synchronization, and a signal of system acquisition information required to access to the base station.

5. An operating method of a terminal in a wireless communication system supporting frequency overlay, the method comprising:

receiving at least one signal which constitutes a common control channel (CCCH) using a radio frequency receiver;

acquiring a first partial common control signal received in the CCCH;

after a common control signal transmission period passes by, acquiring a second partial common control signal received in the CCCH, wherein the CCCH is positioned in a Frequency Assignment (FA) adjacent to a center frequency and occupies less than a total bandwidth of the FA, and wherein locations of the first partial common control signal and the second partial common control signal are switched at every transmission of the CCCH; and constituting a complete common control signal by combining the first partial common control signal and the second partial common control signal.

6. The method of claim 5, wherein the CCCH occupies a half of a bandwidth of the FA.

7. The method of claim 5, wherein the complete common control signal comprises a synchronization signal for acquiring at least one of time, frequency and frame synchronization, and a signal of system acquisition information required to access a base station.

8. The method of claim 7, further comprising:
separating a synchronization signal from the complete common control signal; and
acquiring at least one of time, frequency and frame synchronization using the synchronization signal.

9. An operating method of a terminal in a wireless communication system supporting frequency overlay, the method comprising:

receiving at least one signal which constitutes a first common control channel (CCCH) and a second CCCH using a radio frequency receiver;

obtaining a first partial common control signal and a second partial common control signal through the first CCCH and the second CCCH positioned in different Frequency Assignments (FAs), wherein locations of the first CCCH and the second CCCH are switched at every transmission of the first CCCH and the second CCCH, wherein the first CCCH and the second CCCH are positioned in two FAs adjacent to a center frequency and each occupy less than a total bandwidth of an FA; and constituting a complete common control signal by combining the first partial common control signal and the second partial common control signal.

10. The method of claim 9, wherein the first CCCH and the second CCCH each occupy a half of a bandwidth of an FA.

11. The method of claim 9, wherein the complete common control signal comprises a synchronization signal for acquiring at least one of time, frequency and frame synchronization, and a signal of system acquisition information required to access a base station.

12. The method of claim 11, further comprising:
separating a synchronization signal from the complete common control signal; and
acquiring at least one of time, frequency and frame synchronization using the synchronization signal.

13. An apparatus of a base station in a broadband wireless communication system supporting frequency overlay, the apparatus comprising:

a generator configured to, when it is time to transmit a common control signal, provide partial common control signals which are divided from a complete common control signal;

mappers configured to switch positions of a first Common Control Channel (CCCH) and a second CCCH applied to a previous transmission of the common control signal while mapping the common control signal to the first CCCH and the second CCCH positioned in different Frequency Assignments (FAs), wherein the first CCCH and the second CCCH are positioned in two FAs adjacent to a center frequency and each occupy less than a total bandwidth of an FA; and a transmitter configured to transmit the common control signal via the first CCCH and the second CCCH that are switched.

14. The apparatus of claim 13, wherein the first CCCH and the second CCCH comprise at least one of a Synchronization Channel (SCH) and a Broadcast Channel (BCH).

15. The apparatus of claim 13, wherein the first CCCH and the second CCCH each occupy a half of a bandwidth of an FA.

16. The apparatus of claim 13, wherein the common control signal comprises a synchronization signal for acquiring at least one of time, frequency and frame synchronization, and a signal of system acquisition information required to access to the base station.

17. An apparatus of a terminal in a broadband wireless communication system supporting frequency overlay, the apparatus comprising:

an aggregator configured to acquire a first partial common control signal received in a Common Control Channel (CCCH) and, after a common control signal transmission period passes by, acquire a second partial common control signal received in the CCCH, wherein the CCCH is positioned in a Frequency Assignment (FA) adjacent to a center frequency and occupies less than a total bandwidth of the FA, and wherein locations of the first partial common control signal and the second partial common control signal are switched at every transmission of the CCCH; and a combiner configured to constitute a complete common control signal by combining the first partial common control signal and the second partial common control signal.

18. The apparatus of claim 17, wherein the CCCH occupies a half of a bandwidth of the FA.

19. The apparatus of claim 17, wherein the complete common control signal comprises a synchronization signal for acquiring at least one of time, frequency and frame synchronization, and a signal of system acquisition information required to access a base station.

20. The apparatus of claim 19, further comprising:
a detector configured to acquire at least one of time, frequency and frame synchronization using the synchronization signal.

21. An apparatus of a terminal in a broadband wireless communication system supporting frequency overlay, the apparatus comprising:

an aggregator configured to obtain a first partial common control signal and a second partial common control signal through a first Common Control Channel (CCCH) and a second CCCH positioned in different Frequency Assignments (FAs), wherein locations of the first CCCH and the second CCCH are switched at every transmission of the first CCCH and the second CCCH, wherein the first CCCH and the second CCCH are positioned in two FAs adjacent to a center frequency and each occupy less than a total bandwidth of an FA; and a combiner configured to constitute a complete common control signal by combining the first partial common control signal and the second partial common control signal.

22. The apparatus of claim 21, wherein the first CCCH and the second CCCH each occupy a half of a bandwidth of an FA.

23. The apparatus of claim 21, wherein the complete common control signal comprises a synchronization signal for acquiring at least one of time, frequency and frame synchronization, and a signal of system acquisition information required to access a base station.

24. The apparatus of claim 23, further comprising:
a detector configured to acquire at least one of time, frequency and frame synchronization using the synchronization signal.

* * * * *